United States Patent [19]

Desy

[11] 3,919,572
[45] Nov. 11, 1975

[54] ELECTRICAL MOTOR CONSTRUCTION
[75] Inventor: Jacques J. Desy, Bearsville, N.Y.
[73] Assignee: Rotron, Incorporated, Woodstock, N.Y.
[22] Filed: Dec. 26, 1973
[21] Appl. No.: 428,081

[52] U.S. Cl. .................. 310/45; 310/67; 310/270
[51] Int. Cl.² ............................... H02K 15/12
[58] Field of Search ..... 310/40 MM, 270, 271, 260, 310/67, 43, 85, 89, 91, 45, 42; 117/128 A; 29/596, 597; 336/205

[56] References Cited
UNITED STATES PATENTS

| | | | |
|---|---|---|---|
| 2,427,282 | 9/1947 | Hoover | 310/270 |
| 2,683,233 | 7/1954 | Ruhl | 310/270 |
| 2,926,838 | 3/1960 | Van Rijn | 310/67 |
| 3,002,119 | 9/1961 | Lindstrom | 310/260 |
| 3,014,145 | 12/1961 | Lindstrom | 310/258 |
| 3,042,820 | 7/1962 | Diamond | 310/45 |
| 3,436,815 | 4/1969 | Sheets | 310/45 |
| 3,514,654 | 5/1970 | Moresi | 310/67 |
| 3,766,416 | 10/1973 | Papst | 310/43 |
| 3,772,544 | 11/1973 | Wrobel | 310/67 |
| 3,786,290 | 1/1974 | Papst | 310/67 |

Primary Examiner—R. Skudy
Attorney, Agent, or Firm—Brumbaugh, Graves, Donohue & Raymond

[57] ABSTRACT

A construction for the rotor or stator of an electrical motor is described. An annular leaf spring is retained on an axially extending central arbor by a flange at one end of the arbor. A mounting structure containing an insulator is next placed on the arbor and pushed against the spring. Then the stator or rotor assembly, which consists of an insulated stack of magnetic laminations carrying resin impregnated but uncured conductor windings, is mounted on the arbor. Finally, an insulated cap with a plurality of locking tabs is pressed over an indentation in the other end of the central arbor. The insulator in the mounting structure and the insulated cap are formed in the general shape of the end turns, and the smooth outlines of these insulators force the end turns into a predetermined shape as the end cap is snapped onto the arbor. Once assembled the unit is temperature cycled to cure the resin of the windings.

11 Claims, 3 Drawing Figures

ELECTRICAL MOTOR CONSTRUCTION

BACKGROUND OF THE INVENTION

This invention relates to electrical motors and, more particularly, to miniature electrical motors having relatively severe volume limitations.

The typical miniature motor has crowded, highly stressed windings and inadequate heat transfer paths. The windings of these motors must be formed, insulated, connected to leads and resin impregnated within precise dimensions so that they will fit together with the other elements of the motor. The preforming and hard curing of the windings usually requires ovenheating of several units in large metallic fixtures or molds at temperatures approaching 400°F. Such high temperatures are required to expedite the curing and to allow for adequate heat transfer to the innermost windings. Furthermore, with preformed and hard cured windings, assembly of the motor can cause undesirable stresses to be applied to the windings since manufacturing variations prevent a perfect fit of each winding within the motor structure. On the one hand, forcing the windings to fit produces stresses and on the other hand, making the space large enough so that it is unnecessary to apply force to the windings will reduce the heat dissipation paths.

Manufacturing techniques have been devised which eliminate the final forming and overcuring operations. These generally require encapsulating the stator with plastic compounds that are typically transfer molded over the windings at high pressures and temperatures, which subject the windings to much lower temperature levels than does the curing of conventional resins, but creates much greater tendency for thermal shock. Also, the molded encapsulation provides limited heat dissipation from the windings to the adjoining motor structure and an integrally molded product (combining for example, the stator encapsulation and the spider-hub portion of an electric fan) can be realized only when the proper grade and formulation of plastic compounds are used. Further, this somewhat complex technique is not compatible with the use of dissimilar materials for the various parts of the motor (such as when stator windings are sought to be integrally molded with a metal motor structure) because of the possibly widely varying and conflicting properties of the materials. Since metallic structures are usually required where high power densities and/or high ambient temperatures must be dealt with, a motor construction that allows for the forming and curing of the windings at low temperatures, when a metal structure is used, would be desirable.

SUMMARY OF THE INVENTION

The present invention is directed to reducing the prospect of damage to the windings of miniature motors having metallic structures by reducing the handling of the windings, efficiently using the space at the end turns to minimize stresses, providing improved heat transfer paths and reducing the time and temperatures required for the curing of the resin which encapsulates the windings. The object of the present invention is achieved by using resin impregnated but uncured windings which are mechanically forced into a preferred shape during the assembly of the motor under relatively low stresses, thereby allowing for ease of manufacture.

In an illustrative embodiment of the invention the construction of the stator portion of an inside-out motor is described, although the principles can be applied to rotor construction and also for other motor configurations. The stator element in the example has a hollow central arbor in which the rotor shaft is journalled. An annular leaf spring is placed over the central arbor and is retained on it by a flange at one end of the central arbor. Next, a stator mounting structure or spider is slid over the central arbor and pushed against the leaf spring. An insulator having the general shape of the end turns of the stator windings is placed in the mounting structure. Then the stator assembly, which consists of an insulated stack of magnetic laminations carrying the conductors of the stator windings, is mounted on the central arbor. In the motor disclosed, the stator conductors are resin impregnated, but uncured.

Finally, an insulated cap is pressed onto the central arbor. Like the insulator in the mounting structure, this insulated cap is formed in the general shape of the end turns. As the insulated cap is pressed onto the arbor, the end windings are compressed and the smooth outline of the insulators gradually engage the end turns, forcing them into a predetermined shape. This results in an efficient placement of the end turns within the insulators which is not possible in prior art assemblies. The insulated end cap is provided with a plurality of locking tabs, which snap into an indentation in the form of an annular groove around the central arbor, to hold the entire assembly together. Once assembled the unit can be temperature cycled at a relatively low temperature as necessary for the curing of the resin.

BRIEF DESCRIPTION OF THE DRAWINGS

The foregoing and other features of the present invention will be more readily apparent from the following detailed description and drawings in which.

DESCRIPTION OF AN EXEMPLARY EMBODIMENT

Figure 1:
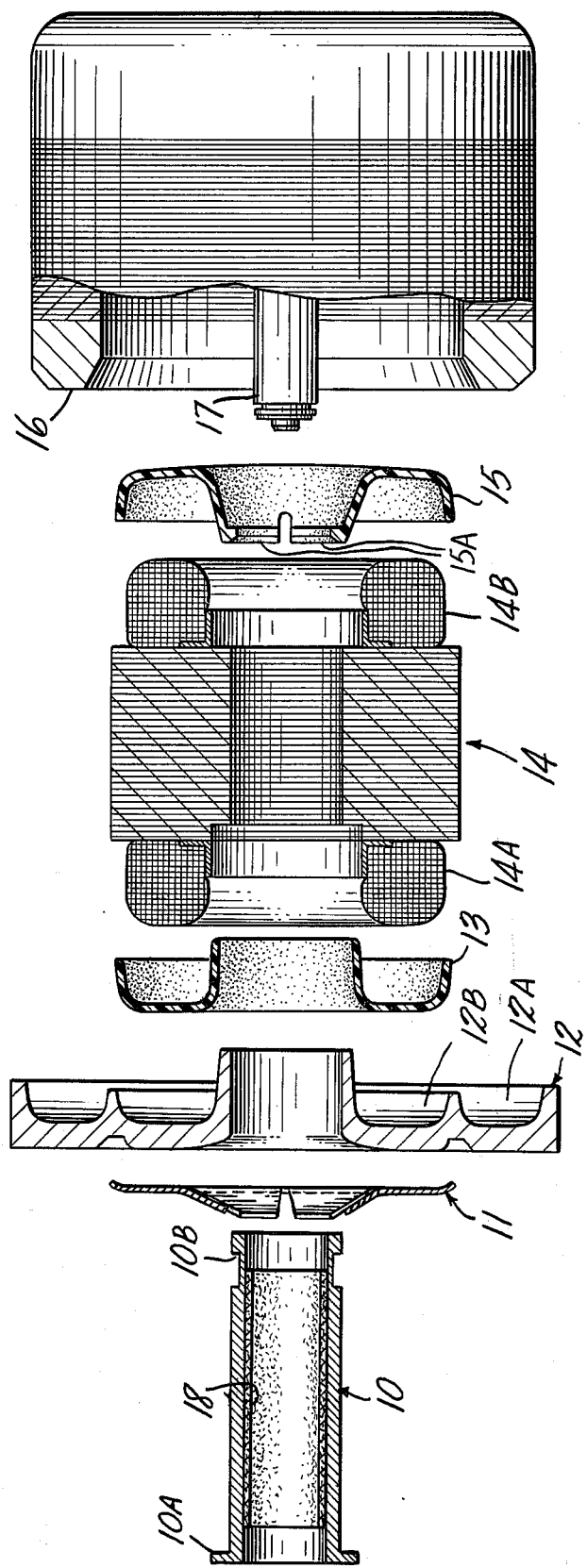
FIG. 1 is an exploded view of an illustrative embodiment of the invention used in the construction of the stator of an inside-out motor.
Figure 2:
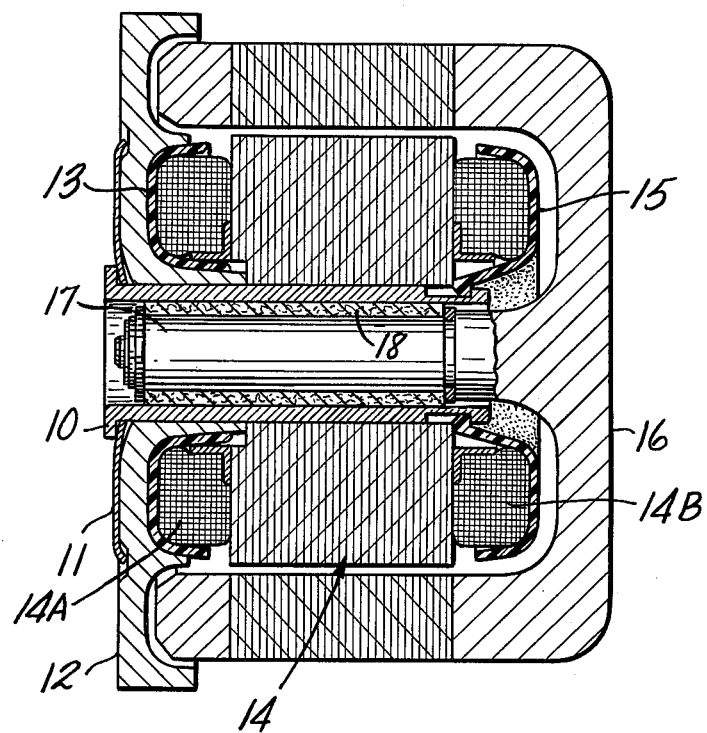
FIG. 2 is a fully assembled sectional view of the motor along lines 2—2 of FIG. 3.
Figure 3:
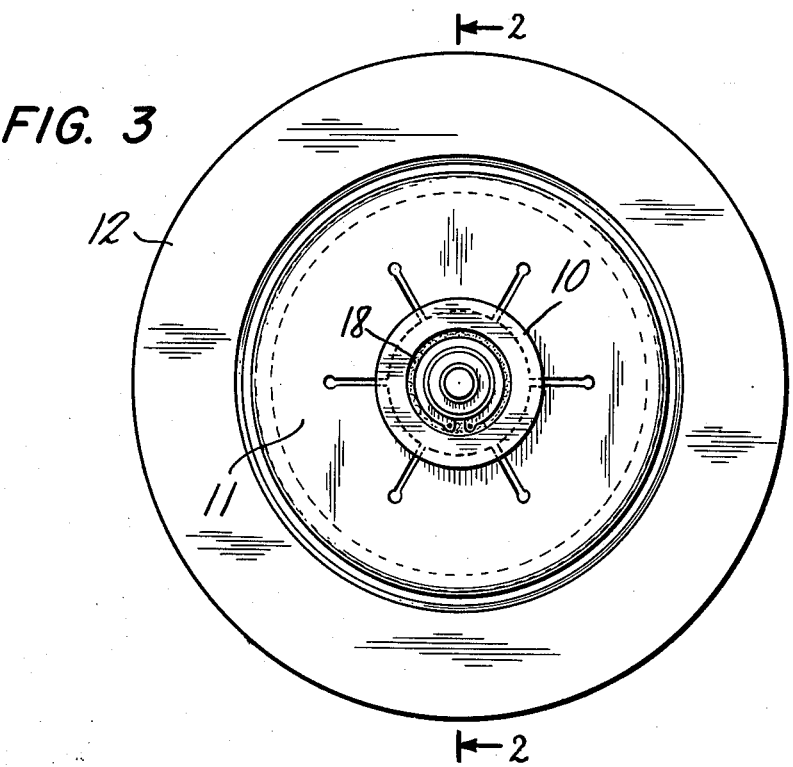
FIG. 3 is a view of the end of the assembled motor showing the leaf spring.

FIG. 1 is an exploded view of a miniature inside-out electrical motor in which the rotor is of conventional construction but the stator is constructed according to the principles of the present invention. FIG. 2 is a sectional view of the motor along lines 2—2 in FIG. 3 in its fully assembled state and the same reference numbers have been used in all views to identify the same parts.

Turning to FIG. 1, the stator structure is indicated generally by the reference numeral 14 and consists of a stack of steel laminations with the usual end turns 14A and 14B of the stator windings. These windings are of insulated (usually varnished) wire and are of small gauge and relatively fragile in the case of a small motor. The stator is to be secured to the spider or supporting structure 12 in the novel manner to be described. The rotor 16 is generally cup-shaped to fit around the stator in the inside-out configuration shown and includes an axially extending shaft 17 anchored in its end wall. The remaining elements of the novel construction will be described in conjunction with an explanation of the manner of assembly.

The construction of the stator is commenced by slipping an annular leaf spring 11 onto a central arbor 10, preferably of a suitable metal, from the right as shown in the Figures. The spring 11 is prevented from sliding off the other end of the arbor 10 by a flange 10A on the end of the arbor. A spider or mounting structure 12, which preferably is made of metal to increase heat dissipation characteristics of the motor, is next placed on the arbor 10. The mounting structure has two annular grooves 12A and 12B which accept the end of the rotor and an annular insulator 13 respectively. The latter is next slipped on to the arbor and against the structure 12. The insulator 13 and the recess 12B in which it is located have a shape that corresponds to a preferred minimum stress outline for the stator end turns 14A. In motors where heat dissipation is not critical the mounting structure 12 can be made of an insulating material and the insulator 13 can be eliminated.

Next the stator assembly 14 is slipped onto the central arbor 10. This assembly consists of a stack of magnetic laminations which have grooves in them for carrying the conductors that make up the stator windings. As the conductors are wound back and forth in the grooves of the laminations according to a wiring plan, a build up of wire called end turns is created at both ends of the stator. These end turns indicated generally as 14A and 14B, are impregnated with resin but uncured. The impregnation resin used could be one of a number of such resins, such as styrenated polyester resin of medium viscosity, catalyzed with 1.0 to 1.5 percent tertiary butyl perbenzoate. There are numerous styrenated polyester resins available commercially, for example, Sterling Y-770 Tere-Gard (Reichold Chemicals, Inc.), Hetron 31 (Hooker Chemical Corp.) and 772M (Schenectady Chemical).

To complete the construction of the stator, an insulated end cap 15 is pushed onto the end of the central arbor 10. Similar to the insulator 13, the end cap 15 has a shape that corresponds to a preferred outline for the stator end turns 14B. As the end cap is pushed onto the central arbor the other elements are pressed together against the tension of leaf spring 11 and the smooth outline of insulator 13 and end cap 15 force the resin impregnated, but uncured, stator end turns 14A and 14B, respectively, into the preferred shape for minimum wire stress at both ends and maximum heat transfer at the structure end. Eventually, the locking tabs on the end cap 15 will snap into an annular detent groove 10B in the central arbor, thus holding the entire stator together.

With this arrangement the leaf spring 11 provides a nearly constant pre-load allowing wide variations in the physical dimensions of the materials used in the motor over wide temperature ranges. Also, the efficient placement of the stator end turns 14A and 14B allows for a good heat transfer between the stator windings and the insulators, central arbor and mounting structure. The elimination of the pre-forming and pre-curing operations of the prior art provides a substantial decrease in magnetic wire stress-loading since the windings are free to move during the assembly and can assume a position of minimum stress while still providing zero-axial-clearance between a portion of the winding and the structure. In addition, the construction prescribed decreases the processing and handling of the wire and, thereby, decreases the possibility of damage in the course of normal production, assuring greater product reliability and lower manufacturing cost.

Before the rotor is mounted on the structure the leads that supply electrical current are connected to the stator windings and the stator is temperature-cycled as necessary for the impregnation curing. With the stator construction illustrated this can usually be done at about 250°F for 15 minutes rather than the 400°F used with conventional construction techniques. This lower temperature can be used because a large fixture need not be heated. Instead the assembled stators themselves are heated. Naturally the use of a lower temperature reduces the chances of damaging the stator windings by thermal shock. A further reduction of stresses on the windings may be achieved through elimination of temperature cycling, such as by using room temperature type curing agents, for example, Hetron 31, in the formulation of the impregnating resin. The room temperature curing of Hetron 31 is described in Hooker Chemical Corp. Service Bulletin No. 2000, and is accomplished by the addition of a suitable promoter, such as cobalt naphthenate, prior to adding the catalyst.

Once the stator has been constructed the cup shaped rotor 16 is mounted on the motor. The central shaft 17 of the rotor is journalled in a suitable bearing, such as a bronze sintered sleeve 18 or other conventional bearing means, secured within the arbor 10. The rotor can be of conventional design or could be constructed according to the principals of the present invention where if constructed with winding heads, the latter would require some restraining member to react against centrifugal forces. Also, the rotor can be constructed according to the present invention whenever axial restraining members, shields or insulating devices are needed to contain the wound armature.

While the invention has been particularly shown and described with reference to preferred embodiments thereof, it will be understood by those skilled in the art that various changes in form and details may be made therein without departing from the spirit and scope of the invention. In particular the principles of the invention illustrated with the inside-out or inverted-type motor shown in the drawings will work equally as well with a conventional motor in which the stator surrounds the rotor.

I claim:

1. An electrical motor having a rotor element and a stator element, at least one of said elements comprising:

a central arbor with a flange at one end and an annular detent groove at the other end;

a leaf spring mounted on said arbor and located against the flange;

a motor mounting structure located on said arbor next to said leaf spring, said mounting structure having an annular recess concentric with the axis of said central arbor;

an insulating means for the annular recess of said mounting structure, said insulating means having a smooth predetermined shape;

a motor element winding assembly located on said central arbor with one of its winding end turns in contact with said insulating means; and an insulating annular end cap mounted on said central arbor, the inner edge of said end cap having at least one tab which mates with the annular detent groove in said central arbor and holds the parts of the motor element together, the surface of said end cap facing the other of the winding end turns of said motor element having a smooth predetermined shape, thereby allowing the smooth surfaces of said insulating means and said end cap to hold the winding end turns of said motor element in a predetermined shape when the tab of the end cap is engaged in the annular detent groove of the central arbor.

2. An electrical motor as claimed in claim 1, in which the motor is a miniature motor.

3. An electrical motor as claimed in claim 1, in which said motor element winding assembly comprises
a stack of annular metal laminations having a plurality of peripheral grooves; and
a conductor wound about said stack of laminations in the grooves, thus creating winding end turns at both ends of said stack of laminations.

4. An electrical motor as claimed in claim 3, with said conductor windings being impregnated with an uncured resin.

5. An electrical motor as claimed in claim 4, in which said resin is a styrenated polyester resin of medium viscosity, catalyzed with 1.0 to 1.5 percent tertiary butyl perbenzoate.

6. An electrical motor as claimed in claim 4 in which said resin is curable at room temperature.

7. In an electric motor construction, means for securing a motor element to a mounting structure, said motor element having a set of winding end turns formed on each end of a cylindrical laminated magnetic member, comprising:
a preformed insulating means adapted to envelop a set of said end turns;
a preformed insulating member adapted to envelop the other set of said end turns; and
a cylindrical arbor adapted to pass axially through said mounting structure, said insulating means, said motor element and said insulating member in the order named, said arbor having flange means at one end for engaging said mounting structure and detaining means at the other end for engaging said insulating member to hold the parts of said securing means in assembled relationship.

8. The electric motor construction according to claim 7 wherein said mounting structure is made of insulating material and said preformed insulating means is an annular groove in said mounting structure adapted to envelop the set of said end turns.

9. The electric motor construction according to claim 7 wherein said mounting structure is made of conducting material and said preformed insulating means is a preformed annular insulating member adapted to envelop the set of said end turns.

10. In the electric motor construction according to claim 7 said securing means further comprising spring means between said mounting structure and said flange means on said arbor for maintaining said assembly under a substantially constant load condition.

11. The securing means in an electric motor construction according to claim 10, wherein the detaining means of said arbor comprises an annular groove and said insulating member includes at least one locking tab for engaging said annular groove to resist relative axial displacement therebetween.

* * * * *